(12) United States Patent
Klensch et al.

(10) Patent No.: US 8,549,035 B2
(45) Date of Patent: *Oct. 1, 2013

(54) OPERATIONAL INFORMATION PROVIDERS

(75) Inventors: Christian Klensch, Angelbachtal (DE); Bernd Ecker, Ludwigshafen-Ruchheim (DE)

(73) Assignee: SAP AG, Walldorf (DE)

( * ) Notice: Subject to any disclaimer, the term of this patent is extended or adjusted under 35 U.S.C. 154(b) by 38 days.

This patent is subject to a terminal disclaimer.

(21) Appl. No.: 13/404,203

(22) Filed: Feb. 24, 2012

(65) Prior Publication Data

US 2012/0158779 A1    Jun. 21, 2012

Related U.S. Application Data

(63) Continuation of application No. 12/197,328, filed on Aug. 25, 2008, now Pat. No. 8,150,871.

(51) Int. Cl.
*G06F 17/30* (2006.01)

(52) U.S. Cl.
USPC ............................. 707/770; 707/602; 707/771

(58) Field of Classification Search
None
See application file for complete search history.

(56) References Cited

U.S. PATENT DOCUMENTS

| | | | |
|---|---|---|---|
| 6,377,993 B1 * | 4/2002 | Brandt et al. | 709/227 |
| 6,604,104 B1 | 8/2003 | Smith | |
| 6,714,979 B1 * | 3/2004 | Brandt et al. | 709/225 |
| 7,225,249 B1 | 5/2007 | Barry et al. | |
| 7,389,355 B2 | 6/2008 | Brown et al. | |
| 7,617,265 B2 | 11/2009 | Ito et al. | |
| 7,756,822 B2 | 7/2010 | Danner et al. | |
| 7,836,104 B2 | 11/2010 | Schemer et al. | |
| 8,150,871 B2 * | 4/2012 | Klensch et al. | 707/770 |
| 2002/0078173 A1 | 6/2002 | Horn et al. | |
| 2002/0129145 A1 | 9/2002 | Chow | |
| 2003/0023607 A1 | 1/2003 | Phelan et al. | |
| 2005/0222931 A1 * | 10/2005 | Mamou et al. | 705/35 |
| 2008/0059441 A1 | 3/2008 | Gaug et al. | |
| 2008/0208805 A1 * | 8/2008 | Wang et al. | 707/3 |
| 2008/0263514 A1 | 10/2008 | DeMesa et al. | |
| 2009/0177697 A1 * | 7/2009 | Gao et al. | 707/104.1 |

* cited by examiner

*Primary Examiner* — Debbie Le
(74) *Attorney, Agent, or Firm* — Kenyon & Kenyon LLP

(57) ABSTRACT

In a computer program product, system and method for retrieving operational data, a front-end unit generates a query for operational data. In an embodiment, in response to the generation of the query, an operational information provider is sent to a back-end unit to retrieve real-time operational data from the back-end unit using a retrieval method specified in the operational information provider. The retrieved operational data, including the real-time operational data is received by the front-end unit from the back-end unit.

19 Claims, 4 Drawing Sheets

OPERATIONAL INFORMATION PROVIDERS

FIELD OF THE INVENTION

The present invention relates generally to the field of Enterprise Service Oriented Architecture (ESOA), and more particularly to a system and method of using operational information providers to standardize and unify data access to operational data.

BACKGROUND

Enterprise Service Oriented Architecture (ESOA) is a business-driven software architecture pioneered by SAP® that can serve as a blueprint for an adaptable, flexible, and open IT architecture for developing services-based, enterprise-scale business solutions and can provide increased adaptability, flexibility, openness, and cost-efficiency to end users. Service Oriented Architecture (SOA) is an available computer architecture used by information technology professionals to develop business applications. An SOA can be used to define a set of global service modules that can be distributed over a network and used to give business applications functionality. Examples of service modules might include a log-in service, a reservation service, a data retrieval service, and so on. By linking a series of these services, an application designer can create new applications without the need for redundant programming. For example, when developing a reservation application for a hotel, a designer may define the way in which the already-programmed service modules, e.g., log-in module, a reservation module, a scheduling module, interact with one another.

As software solutions become more complex, the number of software applications and modules used in an application may also increase, and there may be many dependencies between the different applications and the modules used by each application. Different portions of the software may need to convey data to or retrieve data from other portions, and while much of this data may be similar, much of the data may be stored in different locations and formats and accessed in different ways. For example, each software application may use a different interface to transfer data from and to other applications, leading to a complex architecture that is difficult to manage.

Developing reporting applications can be complicated, for example, because the data needed to generate the report might be located in multiple, disparate locations, including on third-party hosts. Some of the data used might be static data residing in a data warehouse. For example, budget data from past fiscal years can be accessed directly from a data warehouse because the data does not change once entered. Other types of data needed to generate a report, however, might not be suitable for storage in a business warehouse database because it is constantly being changed. For example, the percentage of a budget consumed is the function of a budget-to-date value and a total-budget value, and because the budget-to-date value is constantly changing with time, so is the percentage of budget consumed. Therefore, the percentage of budget consumed is operational information that needs to be obtained by a business process rather than a database.

Operational data can frequently be the product of many business processes and calculations involving such can often be quite complex. Because of this complexity, it is undesirable to have individual applications recalculate operational data when it is needed. Accordingly, a need exists to provide a system which allows for the retrieval and use of operational data from one application by another application in an enterprise system.

DETAILED DESCRIPTION

The present invention provides systems, methods, computer-readable medium able to implement methods which include using operational information providers to enhance an enterprise service oriented architecture (ESOA) and other such architectures by providing an interface to operational data that can be optimized for data and metadata retrieval.

Figure 1:
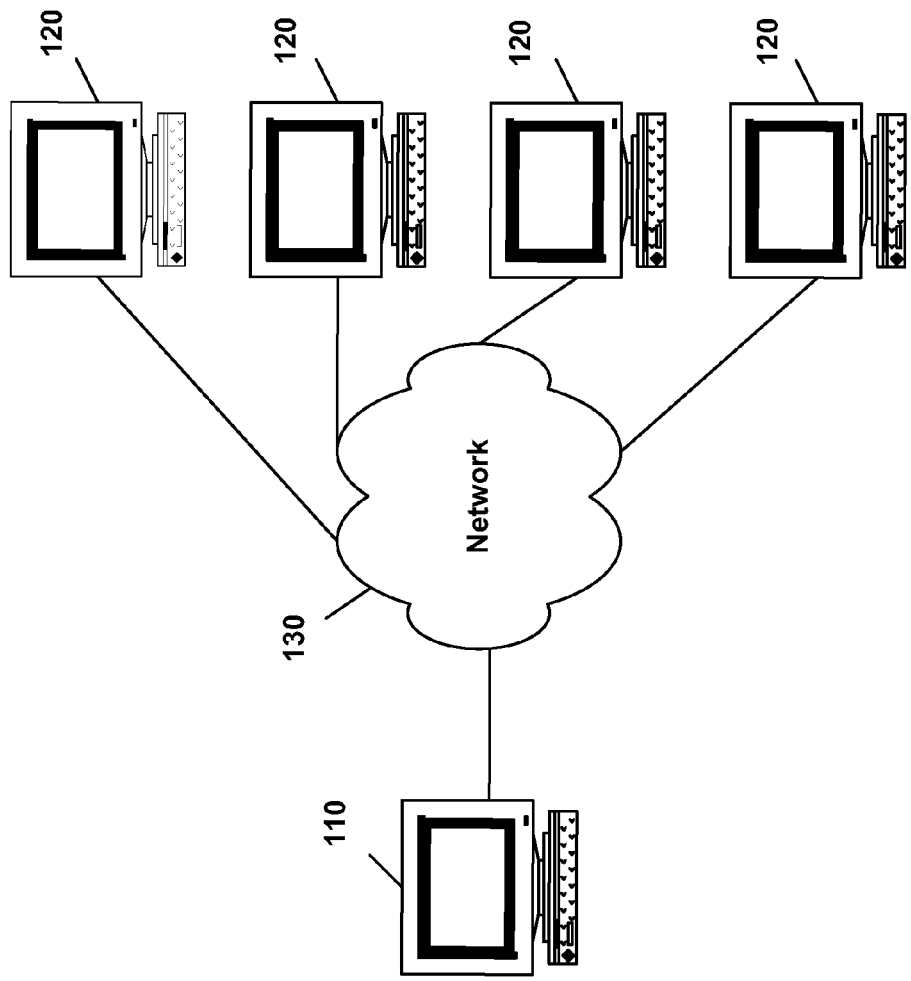
FIG. 1 is a block diagram showing an example computer network in accordance with an embodiment of the present invention.

FIG. 1 shows the components of a computer network architecture that may be used to implement embodiments of the present invention. For example, the system includes a user terminal 110 and one or more remote terminals 120 connected through a network 130. The various components and modules described in the present application may be centrally located on the user terminal 110 and/or may be distributed over the network on the remote terminals 120. Additionally, the various modules and components can be accessible from any of the remote terminals 120 as well as the user terminal 110.

One or more of the terminals 110, 120 may be personal computers, computer workstations, handheld personal digital assistants ("PDA"), or any other type of microprocessor-based device. The network 130 may be a local area network (LAN), wide area network (WAN), remote access network, an intranet, or the Internet, for example. Network links for the network 130 may include telephone lines, DSL, cable networks, T1 or T3 lines, wireless network connections, or any other arrangement that implements the transmission and reception of network signals. However, while FIG. 1 shows the terminals 110, 120 connected through a network 130, the terminals 110, 120 may be connected through other means, including directly hardwired and/or wirelessly connected. In addition, the terminals 110, 120 may be connected to other network devices not shown, such as wired or wireless routers, servers, and databases. The terminals 110, 120 may be connected to one or more peripheral devices, such a local or network printer, mouse, display, storage drives, etc.

Figure 2:
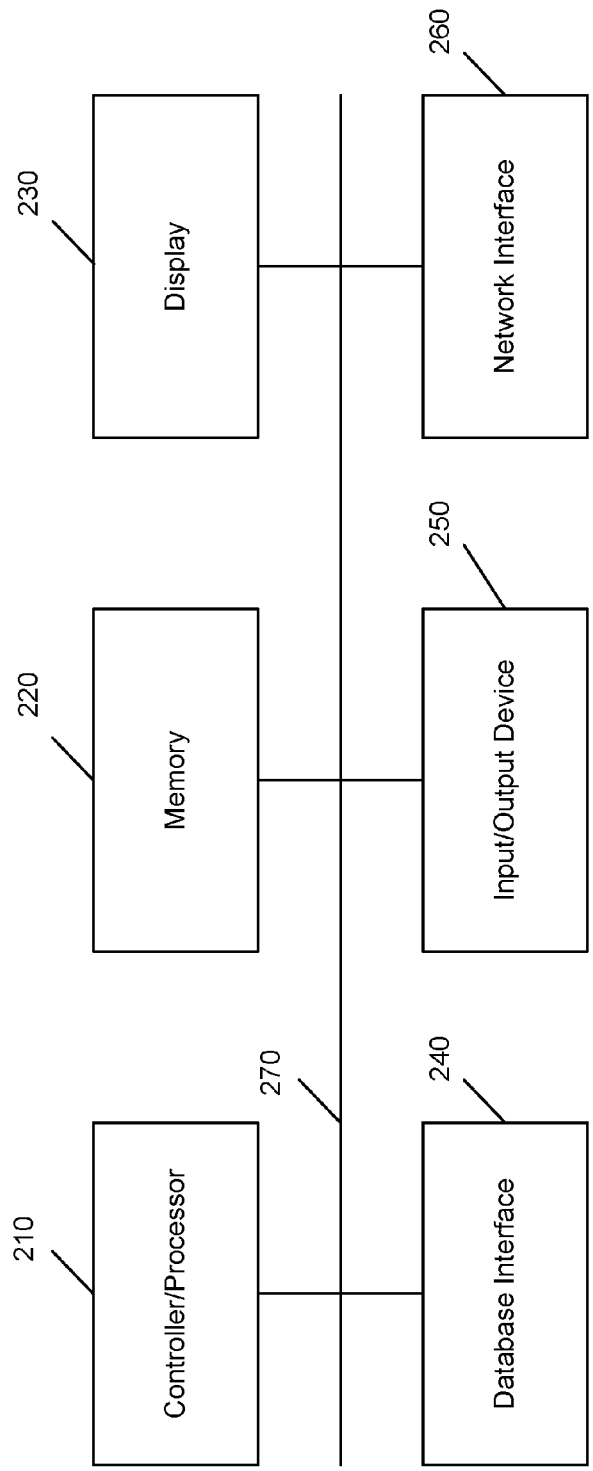
FIG. 2 is a block diagram showing an example structure of a workstation which may be a part of the example computer network of FIG. 1.

FIG. 2 illustrates an example configuration of a user or remote terminal 110, 120. In an embodiment, a terminal includes a controller/processor 210, memory 220, display 230, database interface 240, input/output device interface 250, and/or network interface 260, connected through a bus 270.

The controller/processor 210 may be any programmed processor available to one of skill in the art. However, the concepts of the present invention can also be implemented on a general-purpose and/or a special purpose computer, a programmed microprocessor and/or microcontroller, peripheral integrated circuit elements, an application-specific integrated circuit (ASIC) and/or other integrated circuits, hardware/ electronic logic circuits, such as a discrete element circuit, a programmable logic device, such as a Programmable Logic Device (PLD), Programmable Logic Array (PLA), Field-Programmable Gate Arrays (FPGA), Programmable Array Logic (PAL), and/or the like. In embodiments, any device or devices capable of implementing a framework-based software application can be used to implement aspects of the present invention.

In an embodiment, the Input/Output interface 250 is connected to one or more input devices such as, e.g., a keyboard, mouse, pen-operated touch screen and/or monitor, voice-recognition device, and/or any other device that accepts input. In an embodiment, the Input/Output interface 250 is connected to one or more output devices, such as, e.g., a monitor, printer, disk drive, speakers, and/or any other device for outputting data.

In an embodiment, the memory 220 includes volatile and nonvolatile data storage, including, e.g., one or more electrical, magnetic and/or optical memories such as a RAM, cache, hard drive, CD-ROM drive, tape drive and/or removable storage disk.

In an embodiment, the network interface 260 is connected to a communication device, modem, network interface card, and/or any other device capable of transmitting and receiving signals over a network 130. In an embodiment, the components of the terminals 110, 120 are connected via an electrical bus 270, for example, and/or linked wirelessly.

In an embodiment, client software and databases are accessed by the controller/processor 210 from memory 220 and/or through the database interface 240, and may include, for example, database applications, word processing applications, the client side of a client/server application such as a billing system, as well as components that embody the decision support functionality of the present invention. The terminals 110, 120 may implement any operating system, such as Windows or UNIX, for example. Client and server software may be written in any programming language, such as ABAP, C, C++, Java or Visual Basic, for example.

Figure 3:
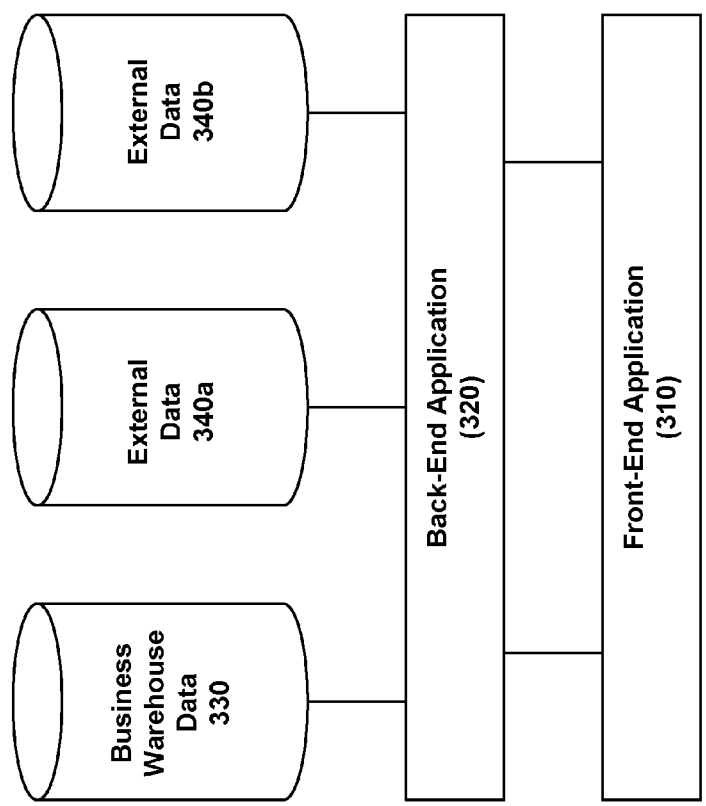
FIG. 3 is a block diagram of a system configured to implement aspects of the present invention.

FIG. 3 is a block diagram of a system configured to implement methods of the present invention. In an embodiment, the system 300 includes a back-end unit 320 to execute a multitude of enterprise resource planning applications. For example, the back-end application 320 stores and processes a substantial amount of business information associated with an enterprise and includes business logic to perform any number of business tasks such as accounting, payroll, and/or inventory.

In an embodiment, the back-end application 320 has access to internal data such as business warehouse data 330. In an embodiment, the application 320 has access to external data 340a-b from one or more third-party data providers. In an example system embodying aspects of the present invention, the back-end application 320 retrieves data from external data providers 340a-b through the use of consumer services in communication with provider services associated with each of the information providers (not shown). The services can operate to transform data from provider formats into formats usable by the system 300. In an embodiment, the back-end application 330 is associated with and/or includes an online analytical processing (OLAP) processor (not shown) to facilitate handling of complex data selection expressions for data retrieval.

In an embodiment, the back-end unit 320 includes one or more consumer services (e.g., consumer query views) to import business data into the system 300 (e.g., external data from one or more information providers). In an embodiment, consumer services allow the tools from the front-end 310 to work with data from information providers and access the data in a unified way for different information providers or sources of data. Consumer services can provide client/application-like access to the provider data. In an embodiment, the consumer services provide enhanced services, allowing detailed exception reporting, list calculation, document integration, and other services typically unavailable when retrieving data from external and/or foreign data sources. In an embodiment, the consumer services expose an application programming interface (API) that describes the data in each request and provides relatively easy access to the data in the result set. For example, the consumer services may be implemented as a Java® API, although those skilled in the art will appreciate that other languages and/or conventions may be used.

In an embodiment, the back-end 320 includes one or more storage services that store and archive business information. For example, a storage service provides access to different data targets available in the system 300, archive dormant data, and/or manage relational and/or multi-dimensional databases. In an embodiment, one or more analysis and access services are provided in the back-end 320. In an embodiment, such a service facilitates an analysis of structured and/or unstructured information stored in the system 300, and may include a data-mining engine. In an embodiment, the back-end 320 includes one or more presentation services to provide different ways of presenting information to an end user. In an embodiment, the presentation service includes a query design engine, a formatting engine, and/or an Extensible Mark-up Language (XML) interface (e.g., to provide data via a Web portal).

In an embodiment, one or more "meta-data" services is provided at the back-end. In general, "meta-data" may refer to, for example, information about business data that is distributed across a landscape of a system's architectural components (e.g., describing what data resides where). In an embodiment, the meta-data service, for example, stores meta-data and handles requests to retrieve, add, change, and/or delete the meta-data. In an embodiment, the meta-data service provides uniform information (that can be customized system wide by the user) on how special values like division by zero and/or undefined currency/unit aggregation should be prepared for presentation in order to guarantee homogeneous presentation of all sources.

In an embodiment, the system 300 includes a front-end unit 310 accessible by a user for executing front-end applications. In an embodiment, the front-end application 310 is remote from the back-end application 320 (e.g., and the two applications 310, 320 may communicate via a communication network such as the Internet). In an embodiment, the front-end application 310 is, for example, a reporting application configured display several types of data, including business warehouse data 330 as well as operational information from the back-end application 320. A user may access the front-end application 310 to request particular information, in a particular format, from the back-end application 320. For example, the user might generate a request or "query" asking for weekly inventory information from a number of different regions over the last year. After the data is retrieved by the back-end application 320, it may be formatted as a report and displayed to the user via the front-end application 310. Data such as weekly inventory information is a type of data that is static and can be stored in a database such as business warehouse database 330.

A front-end application 310 such as a reporting application, however, may need to utilize operational data that is determined in real-time and not stored in a database. In an embodiment, the front-end application 310 uses operational information providers to retrieve operational data from the back-end application 320 for purposes such as reporting. In an embodiment, the operational data is identified by metadata. In an embodiment, the operational information provider includes a data description describing the data to be retrieved and a retrieval method. In an embodiment, based on the identifying metadata, the operational information provider identifies the operational data to be retrieved. In an embodiment, the operational information provider is accessible to a developer as an enterprise service to be used as a query interface to operational data.

In an embodiment, the operational information providers include, for example, metadata optimized for formatting. An example of an operational information provider in WSDL format might appears as follows:

```
wsdl:definitions
name =„QUERY_SERVICE"
targetNamespace=„urn:QUERY_SERVICE"
xmlns:tns=„urn:QUERY_SERVICE"
xmlns:soap=„http://schemas.xmlsoap.org/wsdl/soap"
xmlns:wsdl=„http://schemas.xmlsoap.org/wsdl">
<wsdl:service name=„QUERY_SERVICE">
</wsdl:service>
</wsdl:definitions>
<wsdl:service name=„Query_Service">
<wsdl:port name="QueryServiceSoapPort"
binding="tns:QueryServiceSoapBinding" >
<soap:address location="http://www.sap.... queryservie.asp"/>
</wsdl:port>
</wsdl:service>
<wsdl:message name=„Query_Service.GetData">
<!- Selection Conditions ->
<part name=„field1" type=„xsd:string"/>
<part name=„field2" type=„xsd:integer"/>
...
</wsdl:message>
<wsdl:message name=„Query_Service.GetDataResponse">
<part name=„r_field1" type=„xsd:float"/>
<part name=„r_field2" type=„xsd:float"/>
<part name=„r_field3" type=„xsd:float"/>
.....
</wsdl:message>
<wsdl:operation name=„GetDataFromServer" parameterOrder=„field1 field2">
<wsdl:input message=„wsdlns:Query_Service.GetData " />
<wsdl:output message=„wsdlns:Query_Service.GetDataResponse" />
</wsdl:operation>
<wsdl:portType name= 'QuerySoapPortType'>
<operation name= 'GetDataFromClient' parameterOrder='field1 field2'>
<input message='wsdlns:Query_Service.GetData' />
<output message='wsdlns: Query_Service.GetDataResponse' />
</operation>
<!- hier könnten andere Operationen stehen -->
</wsdl:portType>
```

The example above shows aspects of the abstract part of the WSDL scheme and describes the OIP's specific modelling. The abstract part of the WSDL can contain the XML elements <types>, <message> and <portType>. The area of <types> can be used to declare all used data elements used by the OIP. This data types can be simple or complex. The element <message> can contain the abstract definition of the OIP and the assigned data types. The OIP can have two different messages. The first message can be a data request message such as "Query_Service.GetData," where the assigned data structure might contain, for example, the selection conditions set by the client. A second message such as "Query_Service.GetDataResponse" can send the requested data back to the client. The data structure of the message can depend on the content of the OIP and is individual. The operations can be described in the <portType> section. The OIP works with a "request-response" operation and contains the two messages which are defined in the message area. Other XML elements used in the WSDL definition, such as <binding> and <service>, can describe the concrete content of the services dependent on the interface language and transport protocol like HTTP or SOAP.

In an embodiment, the front-end application 110 is the SAP BI Business Explorer® or NetWeaver®, both available from SAP AG. In an embodiment, the Business Explorer provides a user interface allowing a user to define and submit desired queries and reports using a Web HTML client and/or a MICROSOFT® WINDOWS® client.

In an embodiment, the front-end 310 is used to construct, submit and view data obtained through the back-end 320. For example, a user creates and submits a query view through a reporting application, or through some other tools associated with the front-end 310. In an embodiment, the query view definition and/or query view state change commands are transmitted to the back-end 320 and is operated on to cause relevant data to be retrieved from information sources 330, 340a-b, including internal data sources and one or more external or provider data sources. In an embodiment, users interact with the data via the front-end 310 using a number of different types of applications, including a reporting application, a spreadsheet application, a Web tool, a portal, a mobile device, or a third party application. In an embodiment, the interaction is communicated via state change commands to the backend 320 or the front-end technology directly calls query view APIs for applying the interaction to the query view.

Figure 4:
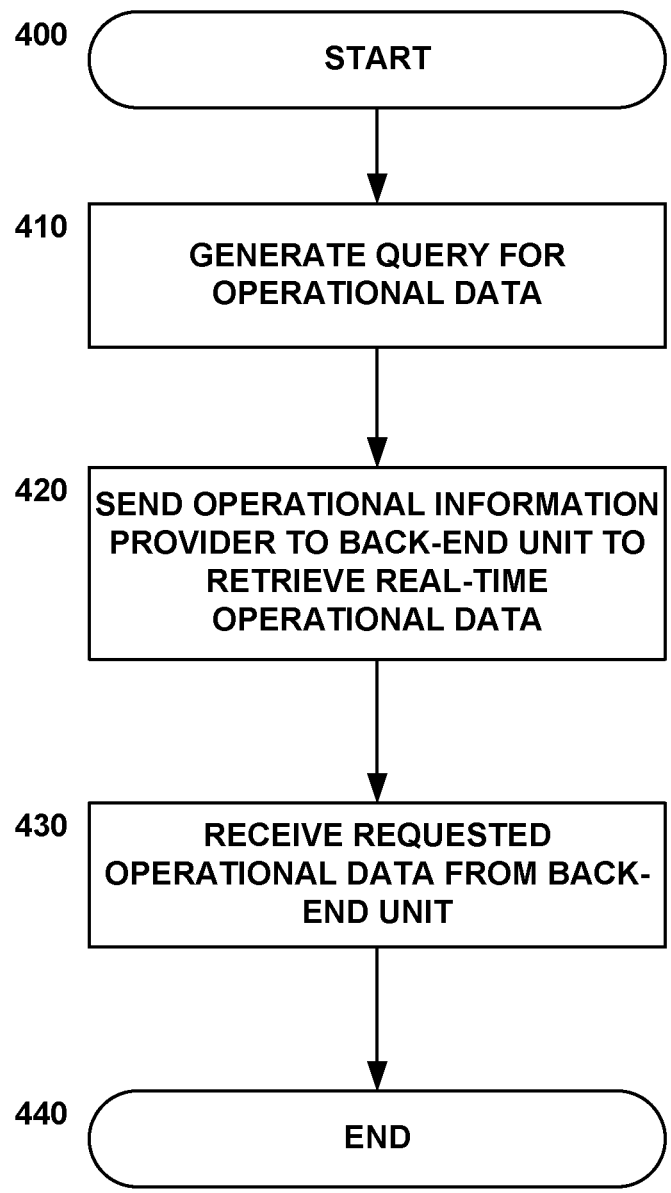
FIG. 4 is a flowchart showing an embodiment of the present invention for retrieving operational data.

FIG. 4 is a flowchart showing an embodiment for retrieving operational data. In block 410, a front-end unit generates a query for operational data. For example, the query identifies the operational data to be retrieved. For example, the query includes an identification of real-time operational data to be retrieved. Real-time operational data may differ from static operational data in that real-time operational data is not stored in a database and rather is obtained from a business process. Static operational data may be stored in a database. In an embodiment, the operational data identification found in a query may be a metadata identifier. In block 420, in response to the query, the front-end unit sends an operational information provider to a back-end unit. In an embodiment, the operational information provider retrieves real-time operational data from the back-end unit. The operational information provider may specify a retrieval method by which real-time operational data is retrieved. The operational information provider may further identify the real-time operational data to be retrieved. In an embodiment, the operational information provider includes a data description of the real-time operational data to be retrieved. In an embodiment, the data description includes a metadata-based description. The operational information provider may be a Web Service Description Language (WSDL) document that specifies data request and data response operations to be performed. In block 430, the requested operational data retrieved from the back-end unit is returned and/or transmitted to the front-end unit.

The foregoing description of embodiments is provided to enable a person skilled in the art to make and use the present invention. Various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment or may be combined with features of alternate embodiments. Therefore, the present invention is not intended to be limited to the embodiments described herein but is to be accorded the widest scope defined only by the claims below and equivalents thereof.

What is claimed is:

1. A method of retrieving operational data, the method comprising:
at a front-end unit, generating a query for retrieving requested operational data, including real-time operational data;
responsive to said generating, sending an operational information provider from the front-end unit to the back-end unit, wherein the operational information provider is sent as a query interface to describe the query to identify real-time operational data to be retrieved from the back-end unit and to specify a retrieval method for the back-end unit that includes data request and data response operations to be performed by the back-end unit;
responsive to receiving the data request and response operations at the back-end unit, executing at least one business operation at the back-end unit, wherein the at least one business operation performs analysis and data mining operations to generate the requested operational data; and
receiving at the front-end unit from the back-end unit the requested operational data, including the real-time operational data.

2. The method of claim 1, further comprising:
at the back-end unit, retrieving the requested operational data from at least one of a plurality of data sources, including a database and an external information provider, and formatting the retrieved operational data based on a format specified in the query; and
at the front-end unit, generating a report using the formatted operational data.

3. The method of claim 1, wherein the operational information provider is part of a service module.

4. The method of claim 1, wherein the operational data contains metadata identifying the operational data.

5. The method of claim 1, wherein the back-end unit executes web services comprising:
a consumer service to import the operational data from an external information provider, generate a report using the operational data;
a storage service to access and manage operational data stored in a database and to archive dormant data; and
a presentation service to format and present operational data to the front-end unit.

6. The method of claim 1, wherein the front-end unit communicates with the back-end unit over the Internet.

7. A non-transitory computer-readable storage medium storing a set of instructions adapted to be executed by a processor to perform a method comprising:
at a front-end unit, generating a query for retrieving requested operational data, including real-time operational data;
responsive to said generating, sending an operational information provider from the front-end unit to the back-end unit, wherein the operational information provider is sent as a query interface to describe the query to identify real-time operational data to be retrieved from the back-end unit and to specify a retrieval method for the back-end unit that includes data request and data response operations to be performed by the back-end unit;
responsive to receiving the data request and response operations at the back-end unit, executing at least one business operation at the back-end unit, wherein the at least one business operation performs analysis and data mining operations to generate the requested operational data; and
receiving at the front-end unit from the back-end unit the requested operational data, including the real-time operational data.

8. The non-transitory computer-readable storage medium of claim 7, further comprising:
at the back-end unit, retrieving the requested operational data from at least one of a plurality of data sources, including a database and an external information provider, and formatting the retrieved operational data based on a format specified in the query; and
at the front-end unit, generating a report using the formatted operational data.

9. The non-transitory computer-readable storage medium of claim 7, wherein the operational information provider is part of a service module.

10. The non-transitory computer-readable storage medium of claim 7, wherein the operational data contains metadata identifying the operational data.

11. The non-transitory computer-readable storage medium of claim 7, wherein the back-end unit executes web services comprising:
a consumer service to import the operational data from an external information provider, generate a report using the operational data;
a storage service to access and manage operational data stored in a database and to archive dormant data; and
a presentation service to format and present operational data to the front-end unit.

12. The non-transitory computer-readable storage medium of claim 7, wherein the front-end unit communicates with the back-end unit over the Internet.

13. A system to retrieve operational data, the system comprising:
a front-end unit, comprising a first processor, a first memory, and a first network interface, to generate a query to retrieve requested operational data, including real-time operational data; and
a back-end unit, comprising a second processor, a second memory, and a second network interface, to retrieve the requested operational data from at least one of a plurality of data sources, including a database and an external information provider;
wherein the front-end unit is to send an operational information provider to the back-end unit, wherein the operational information provider is to be sent as a query interface that describes the query to identify real-time operational data to be retrieved from the back-end unit and to specify a retrieval method for the back-end unit that includes data request and data response operations to be performed by the back-end unit;
wherein the back-end unit is to receive the data request and response operations and the second processor is to execute at least one business operation, wherein the at least one business operation includes analysis and data mining operations to generate the requested operational data; and
wherein the front-end unit is to receive the requested operational data, including the real-time operational data, from the back-end unit.

14. The system of claim 13, wherein the second processor of the back-end unit executes web services comprising:
a consumer service to import the operational data from an external information provider, generate a report using the operational data;

a storage service to access and manage operational data stored in a database and to archive dormant data; and a presentation service to format and present operational data to the front-end unit.

15. The system of claim 13, wherein in response to receiving the operational data from the back-end unit, the first processor of the front-end unit is to generate a report using the operational data.

16. The system of claim 13, wherein the operational information provider is part of a service module.

17. The system of claim 13, wherein the operational data contains metadata identifying the operational data.

18. The system of claim 13, wherein the front-end unit is remote from the back-end unit.

19. The system of claim 18, wherein the front-end unit is to communicate with the back-end unit over the Internet via the first network interface and the second network interface.

* * * * *